United States Patent
Zhao et al.

(10) Patent No.: US 12,261,297 B2
(45) Date of Patent: Mar. 25, 2025

(54) PRE-LITHIATED SILICON-CARBON MULTILAYER COMPOSITE NEGATIVE ELECTRODE MATERIAL FOR LITHIUM ION BATTERIES AND PREPARATION METHOD THEREOF

(71) Applicant: FUJIAN XFH NEW ENERGY MATERIALS CO., LTD., Yongan (CN)

(72) Inventors: Donghui Zhao, Yongan (CN); Pengwei Zhou, Yongan (CN); Yu Bai, Yongan (CN)

(73) Assignee: FUJIAN XFH NEW ENERGY MATERIALS CO., LTD., Yongan (CN)

( * ) Notice: Subject to any disclaimer, the term of this patent is extended or adjusted under 35 U.S.C. 154(b) by 475 days.

(21) Appl. No.: 17/701,405

(22) Filed: Mar. 22, 2022

(65) Prior Publication Data
US 2022/0216477 A1  Jul. 7, 2022

Related U.S. Application Data

(63) Continuation of application No. PCT/CN2019/107858, filed on Sep. 25, 2019.

(30) Foreign Application Priority Data

Sep. 25, 2019  (CN) .......................... 201910912131.X

(51) Int. Cl.
*H01M 4/583*  (2010.01)
*H01M 4/02*   (2006.01)
(Continued)

(52) U.S. Cl.
CPC ......... *H01M 4/583* (2013.01); *H01M 4/0428* (2013.01); *H01M 4/0471* (2013.01);
(Continued)

(58) Field of Classification Search
CPC ............ H01M 4/0428; H01M 4/0471; H01M 4/1393; H01M 4/366; H01M 4/48; H01M 4/583; H01M 4/587; H01M 2004/027
See application file for complete search history.

(56) References Cited

U.S. PATENT DOCUMENTS 10,629,895 B2 * 4/2020 Troegel ................. H01M 4/364
2014/0302396 A1   10/2014 Lu et al.

FOREIGN PATENT DOCUMENTS

CN        104577086    *  4/2015
CN        104577086 A     4/2015
(Continued)

OTHER PUBLICATIONS

English translation of CN Publication 108682803, Oct. 2018.*
(Continued)

*Primary Examiner* — Brittany L Raymond

(57) ABSTRACT

The present invention discloses a pre-lithiated silicon-carbon multilayer composite negative electrode material for lithium ion batteries and a preparation method thereof. The composite negative electrode material includes an amorphous carbon matrix, pre-lithiated silicon monoxide particles and graphene materials; the graphene materials are uniformly coated on the outer surface of the pre-lithiated silicon monoxide to form composite particles; and the composite particles are uniformly dispersed in the amorphous carbon matrix. According to the present invention, the silicon monoxide particles are pre-lithiated to greatly improve the initial coulombic efficiency (ICE) of the silicon-based negative electrode material; the graphene materials greatly improve the mechanical performance and conductivity of the composite materials due to the light weight, high strength and excellent conductivity thereof.

13 Claims, 1 Drawing Sheet

(51) Int. Cl.
- *H01M 4/04* (2006.01)
- *H01M 4/1393* (2010.01)
- *H01M 4/36* (2006.01)
- *H01M 4/48* (2010.01)
- *H01M 10/0525* (2010.01)

(52) U.S. Cl.
CPC ......... *H01M 4/1393* (2013.01); *H01M 4/366* (2013.01); *H01M 4/48* (2013.01); *H01M 10/0525* (2013.01); *H01M 2004/027* (2013.01)

(56) References Cited

FOREIGN PATENT DOCUMENTS

| CN | 106410158 A | 2/2017 |
| CN | 107046125 A | 8/2017 |
| CN | 108682803 | * 10/2018 |
| CN | 108682803 A | 10/2018 |

OTHER PUBLICATIONS

English translation of CN Publication 104577086, Apr. 2015.*
Internation Search Report of PCT/CN2019/107858, Mailed Jun. 24, 2020.

* cited by examiner

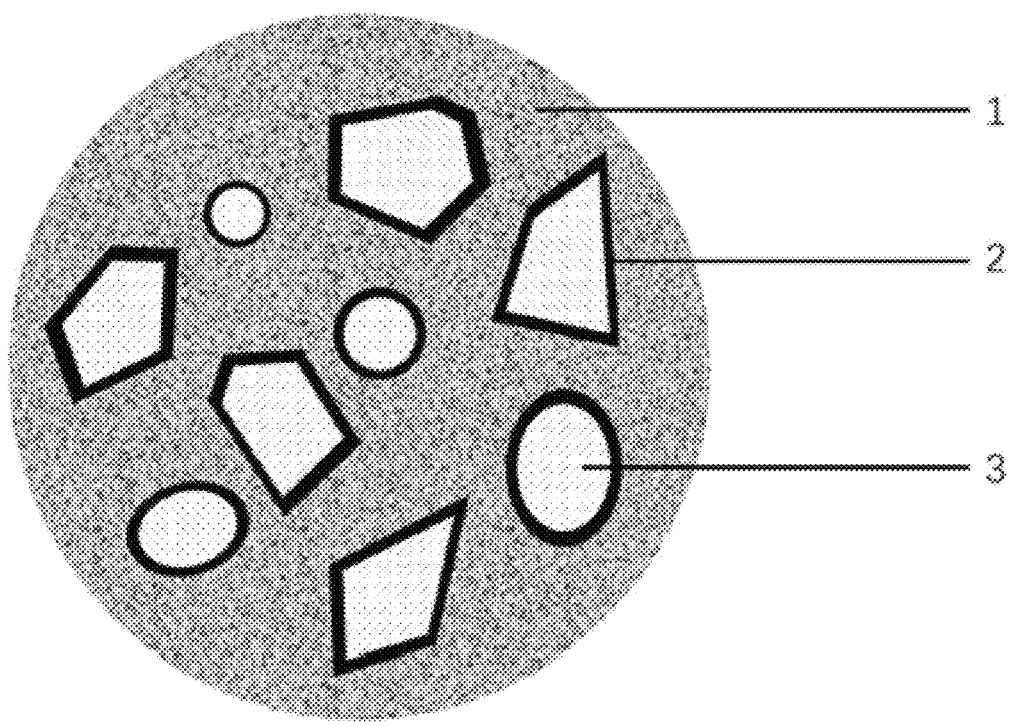

PRE-LITHIATED SILICON-CARBON MULTILAYER COMPOSITE NEGATIVE ELECTRODE MATERIAL FOR LITHIUM ION BATTERIES AND PREPARATION METHOD THEREOF

CROSS-REFERENCE TO RELATED APPLICATIONS

This application is a continuation of International Patent Application No. PCT/CN2019/107858 with a filing date of Sep. 25, 2019, designating the United States, now pending, and further claims priority to Chinese Patent Application No. 201910912131.X with a filing date of Sep. 25, 2019. The content of the aforementioned applications, including any intervening amendments thereto, are incorporated herein by reference.

TECHNICAL FIELD

The present invention relates to the technical field of electrochemistry, in particular to a pre-lithiated silicon-carbon multilayer composite negative electrode material for lithium ion batteries and a preparation method thereof.

BACKGROUND OF THE PRESENT INVENTION

Lithium ion batteries have become the most promising secondary energy storage battery due to many advantages of high volume and mass energy density, high power density, long cycle life, high discharge voltage, low self-discharge rate, no memory effect, little environmental pollution, low cost and wide operating temperature range. The lithium ion batteries show wide application prospects in the fields of portable consumer electronics, new energy vehicles, aerospace, and large-scale energy storage in daily life. With the development of lightweight and highly integrated equipment, the energy density, cycle life, safety performance and other aspects of the lithium ion batteries need to be improved urgently; and one of the important starting points to improve the performance is to improve the performance of the negative electrode materials.

At present, the negative electrode materials most widely used in the lithium ion batteries are graphite materials. Some high-end graphite negative electrodes in the market have a capacity of up to 360-365 mAh/g, which is very close to the theoretical capacity of 372 mAh/g. Therefore, graphite as the negative electrode of the lithium ion batteries has an extremely small energy density improving space, so that the academic and industrial circles have to find a novel negative electrode material with high energy density.

Many kinds of novel negative electrode materials, have been explored at present, and can be divided into three categories of intercalation, alloy and transformation according to different lithium storage mechanisms. The silicon negative electrode material is an alloy lithium-stored negative electrode material, which has attracted wide attention due to the extremely high theoretical specific capacity. Lithium is stored in, silicon at a room temperature (25-85° C.) to generate an alloy phase $Li_{15}Si_4$, which has a theoretical mass specific capacity of up to 3579 mAh/g, and is stored in silicon at a high temperature (100-120° C.) to generate an alloy phase $Li_{22}Si_5$, which has a theoretical mass specific capacity of up to 4212 mAh/g; silicon at the room temperature has a theoretical volume specific capacity of 2081 mAh·$cm^{-3}$, which is also much higher than that of graphite (779 mAh·$cm^{-3}$). Meanwhile, the lithium intercalation potential of silicon is slightly higher than that of graphite, about 0.2 V vs. $Li/Li^+$, which can reduce lithium precipitation to a certain extent and improve the safety of batteries. In addition, silicon is rich in reserves, low in preparation cost and environment-friendly. However, the development of silicon negative electrode materials faces two key problems: the volume change in the cycle process is up to 300%-400%, which causes pulverization and falling of the electrode; and meanwhile, a fresh surface is generated to cause the continuous growth of SEI film, thereby continuously consuming electrolyte. In addition, the intrinsic silicon has low electronic conductivity and ionic conductivity, and poor rate performance.

To solve the above problems, a space can be reserved for the volume expansion of silicon by nanocrystallization, such as silicon particles and silicon nanowires; or a porous nanostructures can be constructed, such as silicon films; or coated or embedded composite structures can be formed together with some matrix materials with high elastic modulus to reduce the contact area between silicon and electrolyte and buffer the volume expansion of silicon, such as a composite of silicon and mesoporous carbon spheres. The composite matrix materials with good conductivity can also reduce the internal resistance of electrodes, such as conductive polymers, carbon materials and metals. The silicon-carbon composite can effectively improve the electrochemical performance of silicon negative electrode. Meanwhile, the silicon-carbon composite can make full use of the existing carbon negative electrode production line; and, the electrolyte systems of the silicon-carbon negative electrode and the existing graphite negative electrode are relatively matched, so such a silicon-carbon composite is also conducive to the gradual transition of lithium ion battery industry. Therefore, the general trend is that the silicon-carbon negative electrode will become the negative electrode material of the next generation lithium ion battery.

The following five silicon-carbon composites are reportedly common in industry: 1. carbon-coated nano-silicon (nano-Si@C), which has low cost, high initial coulombic efficiency (ICE), but high volume expansion and poor long-term cycling stability, and a capacity per unit of generally 400-2000 mAh/g; 2. carbon-coated silicon monoxide (SiO@C), which has high cost, low volume expansion, excellent long-term cycling stability, generally low ICE, and a capacity per unit of generally 1300-1700 mAh/g; 3. carbon-coated silicon nanowires (Si nanowire/SS), which have high specific capacity and ICE, but are hard to ensure the long-term cycling stability due to the necessity of matching with, a mature pre-chemical technology in process; 4. carbon-coated oxygen content-variable silicon monoxide (SiO@C), which increases the ICE or improves the material cycling performance by changing the oxygen content to have high ICE and good long-term cycling, stability, is one of the high-end silicon-carbon negative electrode materials at present, and has a capacity per unit of generally 1300-1700 mAh/g; and 5. carbon-coated amorphous silicon alloy (amorphous-SiM@C), which is prepared by firstly compounding nano-silicon with simple metals (such as Fe and Cu) at high temperature and then coating with a carbon layer, generally high in ICE, but relatively high in preparation cost due to the difficulty in process, and not suitable for mass production at present due to easy precipitation of crystalline silicon during carbonization.

SUMMARY OF PRESENT INVENTION

In view of this, a main purpose of the present invention is to provide a pre-lithiated silicon-carbon multilayer composite negative electrode material for lithium ion batteries and a preparation method thereof; and the pre-lithiated silicon-carbon multilayer composite negative electrode material for lithium ion batteries has the characteristics of excellent mechanical performance, high conductivity, high ICE and stable cycling performance.

To achieve the above purpose, the following technical solutions are adopted by the present invention.

A pre-lithiated silicon-carbon multilayer composite negative electrode material for lithium ion batteries includes an amorphous carbon matrix, pre-lithiated silicon monoxide particles and graphene materials; the graphene materials are uniformly coated, on the outer surface of the pre-lithiated silicon monoxide to form composite particles; and the composite particles are uniformly dispersed in the amorphous carbon matrix.

A preparation method of the pre-lithiated silicon-carbon multilayer composite negative electrode material for lithium ion batteries includes: firstly, taking silicon monoxide as a raw material, mixing silicon monoxide with lithium-containing ionic liquid for sintering and pre-lithiation to obtain pre-lithiated silicon monoxide particles; then, loading a catalyst precursor, growing graphene materials on the surface of pre-lithiated silicon monoxide by chemical vapor deposition (CVD); and finally, homogeneously fusing with a carbon source and performing heat treatment, to obtain the final pre-lithiated silicon-carbon multilayer composite negative electrode material for lithium ion batteries.

As a preferred solution, the preparation, method specifically includes the following steps:

(1) mixing silicon monoxide with a certain particle size with lithium-containing ionic liquid, and then sintering the mixture in a high-temperature tube furnace, so that silicon monoxide and lithium-containing ionic liquid fully react to obtain pre-lithiated silicon monoxide particles;

(2) uniformly dispersing a certain proportion of pre-lithiated silicon monoxide particles in a solution of catalyst precursor by ultrasonic treatment, and then stirring the solution at a certain temperature to volatilize the solvent, so that the catalyst precursor is uniformly loaded on the surfaces of the pre-lithiated silicon monoxide particles;

(3) putting the pre-lithiated silicon monoxide particles loaded with the catalyst precursor into a high-temperature furnace; keeping the temperature in a gas mixture of inert gas and reducing gas for a period of time to fully reduce the catalyst precursor; then keeping the volume ratio of the inert gas to the reducing gas unchanged; starting to feed a gas carbon source; decomposing and reconstructing the carbon source at a higher temperature; and depositing graphene materials on the outer surfaces of pre-lithiated silicon monoxide particles; and (4) uniformly mixing the pre-lithiated silicon monoxide particles coated with the graphene materials with a solid carbon source; then adding the mixture into a fusion machine for homogeneous fusion; and then putting the obtained mixture into a high-temperature furnace for carbonization at a high temperature in an inert atmosphere to obtain the final, pre-lithiated silicon-carbon multilayer composite negative electrode material for lithium ion batteries.

As a preferred solution, silicon monoxide in step (1) has a particle size of 10 nm-10 μm.

As a preferred solution, the lithium-containing ionic liquid in step (1) is one or more of LiMIM-TFSI, LiEMIM-$BF_4$, LiEMIM-$PF_6$, LiEMIM-TFSI, LiPMMIM-TFSI, LiB-MIM-TFSI, LiAAIM-Cl, LiAMIM-Br, LiAEIM-Br, LiAAIM-Br, LiAAIM-I, LiAAIM-TFSI, LiAMIM-TFSA, LiAMIM-$BF_4$, LiEMIM$BF_4$, LiEMIMTFSI, LiEMIMTFSI, LiBMIMBF, LiBMIM$PF_6$, LiBMIM$PF_6$ and LiPM-MIMTFSI.

As a preferred solution, the mass ratio of silicon monoxide to lithium-containing ionic liquid in step (1) is (10-35):1.

As a preferred solution, the gas fed into the high-temperature tube furnace in step (1) is one of inert gases of nitrogen, argon and helium; and the sintering temperature is 500-1000° C.

As a preferred solution, the mass ratio of the pre-lithiated silicon monoxide particles to the catalyst precursor in step (2) is (20-1):1.

As a preferred solution, the catalyst precursor used in step (2) is a transition metal salt, including ferric chloride, ferrous chloride, ferric nitrate, ferrous nitrate, ferric acetate, ferrous acetate, ferric sulfate, ferrous sulfate, ferric oxalate, ferrous oxalate, ferric citrate, ferrous gluconate, ferrocene, cobalt chloride, cobalt nitrate, cobalt acetate, cobalt sulfate, cobalt oxalate, cobalt citrate, cobalt gluconate, cobaltocene, nickel chloride, nickel nitrate, nickel acetate, nickel sulfate, nickel oxalate, nickel citrate, nickel gluconate, nickelocene, copper chloride, copper nitrate, copper acetate, copper sulfate, copper oxalate, copper citrate, copper gluconate and the like; and the solvent is one or more of water, methanol, ethanol, ethylene glycol, isopropanol, glycerol, diethyl ether, acetone, benzene and toluene.

As a preferred solution, the temperature for stirring treatment in step (2) is 25-200° C.

As a preferred solution, the inert gas in step (3) is one of nitrogen, argon and helium; the reducing gas is one or more of hydrogen, ammonia, methane and nitric oxide; the volume percentage of the reducing gas is 10-40%; the gas carbon source accounts for 5-25% of the total volume; and the used gas carbon source is one of acetylene, methane, ethane, ethylene and butene.

As a preferred solution, the temperature for precursor reduction in step (3) is 300-600° C. and is kept for 1-10 h; and the temperature for graphene deposition is 500-1,000° C. and is kept for 5 min-1 h.

As a preferred solution, the solid carbon source used in step (4) is one or more of sucrose, petroleum asphalt, coal tar, epoxy resin, phenolic resin, polyvinyl alcohol and polyvinyl chloride; the rotating speed of the fusion machine is 1,000-2,000 rpm during fusion; and the fusion time is 1-4 h.

As a preferred solution, the temperature for carbonization in step (4) is 700-1,000° C. and is kept for 1-8 h.

Compared with the prior art, the present invention has apparent advantages and beneficial effects. Specifically, the above technical solutions show that:

According to the present invention, the silicon monoxide particles are pre-lithiated to greatly improve the ICE of the silicon-based negative electrode material; the graphene materials greatly improve the mechanical performance and conductivity of the composite materials due to the light weight, high strength and excellent conductivity thereof; the amorphous carbon matrix plays the role of isolating the electrolyte and then preventing silicon from coming into contact with the electrolyte to produce a large number of unstable SET films; and experiments show that the composite negative electrode material prepared in the present invention has the characteristics of excellent mechanical performance, high conductivity, high ICE and stable cycling performance.

DESCRIPTION OF THE DRAWINGS

FIG. 1 is a structural schematic diagram of a composite negative electrode material according to the present invention.

DESCRIPTION OF REFERENCE NUMERALS IN THE ACCOMPANYING DRAWINGS 1. amorphous carbon matrix
2. graphene materials
3. pre-lithiated silicon monoxide particles.

DETAILED DESCRIPTION OF PREFERRED EMBODIMENTS

The present invention discloses a pre-lithiated silicon-carbon multilayer composite negative electrode material for lithium ion batteries, which includes an amorphous carbon matrix 1, pre-lithiated silicon monoxide particles 3 and graphene materials 2 as shown in FIG. 1. The graphene materials 2 are uniformly coated on the outer surface of the pre-lithiated silicon monoxide 3 to form composite particles. The graphene materials 2 play the role of improving the mechanical performance and conductivity. The composite particles are uniformly dispersed in the amorphous carbon matrix 1, which plays a role of isolating the electrolyte and then preventing silicon from coming into contact with the electrolyte to produce a large, number of unstable SET films.

The present invention further discloses a preparation method of the pre-lithiated silicon-carbon multilayer composite negative electrode material for lithium ion batteries. The preparation method includes: firstly, taking silicon monoxide as a raw material, mixing silicon monoxide with lithium-containing ionic liquid for sintering and pre-lithiation to obtain pre-lithiated silicon monoxide particles; then, loading a catalyst precursor, growing graphene materials on the surface of pre-lithiated silicon monoxide by CVD; and finally, homogeneously fusing with a carbon source and performing heat treatment, to obtain the final pre-lithiated silicon-carbon multilayer composite negative electrode material for lithium ion batteries.

The preparation method specifically includes the following steps:

(1) mixing silicon monoxide with a certain particle size with lithium-containing ionic liquid, and then sintering the mixture in a high-temperature tube furnace, so that, silicon monoxide and lithium-containing ionic liquid fully react to obtain pre-lithiated silicon monoxide particles, where silicon monoxide has a particle size of 10 nm-10 μm; the lithium-containing ionic liquid is one or more of LiMIM-TFSI, LiEMIM-PF$_6$, LiEMIM-TFSI, LiPMMIM-TFSI, LiBMIM-TFSI, LiAAIM-Cl, LiAMIM-Br, LiAEIM-Br, LiAAIM-Br, LiAAIM-I, LiAAIM-TFSI, LiAMIM-TFSA, LiAMIM-BF$_4$, LiEMIMBF$_4$, LiEMIMTFSI, LiEMIMTFSI, LiBMIMBF, LiBMIMPF$_6$, LiBMIMPF$_6$ and LiPM-MIMTFSI; the mass ratio of silicon monoxide to lithium-containing ionic liquid is (10-35):1; the gas fed into the high-temperature tube furnace is one of inert gases of nitrogen, argon and helium; and the sintering temperature is 500-1,000° C.;

(2) uniformly dispersing a certain proportion of pre-lithiated silicon monoxide particles in a solution of catalyst precursor by ultrasonic treatment, and then stirring the solution at a certain temperature to volatilize the solvent, so that the catalyst precursor is uniformly loaded on the surfaces of the pre-lithiated silicon monoxide particles, where the mass ratio of the pre-lithiated silicon monoxide particles to the catalyst precursor is (20-1):1; the used catalyst precursor is a transition metal salt, including ferric chloride, ferrous chloride, ferric nitrate, ferrous nitrate, ferric acetate, ferrous acetate, ferric sulfate, ferrous sulfate, ferric oxalate, ferrous oxalate, ferric citrate, ferrous gluconate, ferrocene, cobalt chloride, cobalt nitrate, cobalt acetate, cobalt sulfate, cobalt oxalate, cobalt citrate, cobalt gluconate, cobaltocene, nickel chloride, nickel nitrate, nickel acetate, nickel sulfate, nickel oxalate, nickel citrate, nickel gluconate, nickelocene, copper, chloride, copper nitrate, copper acetate, copper sulfate, copper oxalate, copper citrate, copper gluconate and the like; the solvent is one or more of water, methanol, ethanol, ethylene glycol, isopropanol, glycerol, diethyl ether, acetone, benzene and toluene; and the temperature for stirring treatment is 25-200° C.;

(3) putting the pre-lithiated silicon monoxide particles loaded with the catalyst precursor into a high-temperature furnace; keeping the temperature in a gas mixture of inert gas and reducing gas for a period of time to fully reduce the catalyst precursor; then keeping the volume ratio of the inert gas to the reducing gas unchanged starting to feed a gas carbon source; decomposing and reconstructing the carbon source at a higher temperature; and depositing graphene materials on the outer surfaces of pre-lithiated silicon monoxide particles, where the inert gas is one of nitrogen, argon and helium; the reducing gas is one or more of hydrogen, ammonia, methane and nitric oxide; the volume percentage of the reducing gas is 10-40%; the gas carbon source accounts for 5-25% of the total volume; the used gas carbon source is one of acetylene, methane, ethane, ethylene and butane; the temperature for precursor reduction is 300-600° C. and is kept for 1-10 h; and the temperature for graphene deposition is 500-1,000° C. and is kept for 5 min-1 h; and (4) uniformly mixing the pre-lithiated silicon monoxide particles coated with the graphene materials with a solid carbon source, then adding the mixture into a fusion machine for homogeneous fusion, and then putting the obtained mixture into a high-temperature furnace for carbonization at a high temperature in an inert atmosphere to obtain the final pre-lithiated silicon-carbon multilayer composite negative electrode material for lithium ion batteries, where the used solid carbon source is one or more of sucrose, petroleum asphalt, coal tar, epoxy resin, phenolic resin, polyvinyl alcohol and, polyvinyl chloride; the rotating speed of the fusion machine is 1,000-2,000 rpm during fusion; the fusion time is 1~4 h; and the temperature for carbonization is 700-1,000° C. and is kept for 1-8 h.

The present invention will be further described in detail below in combination with several embodiments.

Embodiment 1

A preparation method of the pre-lithiated silicon-carbon multilayer composite negative electrode material for lithium ion batteries specifically includes the following steps:

(1) putting silicon monoxide particles into a high-energy ball mill for, ball milling, setting the rotating speed of the ball mill at 500 rpm, setting the mass ratio of grinding balls to particles at 100:1, and setting the ball-milling time to be 24 h;

(2) putting the ball-milled silicon monoxide particles into a fusion machine, and adding lithium-containing ionic liquid LiMIM-TFSI, wherein the mass ratio of the silicon monoxide particles to the lithium-containing ionic liquid is 20:1, and the fusion time is 3 h;

(3) putting the mixed silicon monoxide particles into a high-temperature tube furnace; sintering; feeding argon for protection; heating up to 600° C. and keeping the temperature for 2 h so that the silicon monoxide particles can fully react with the lithium-containing ionic liquid; and then automatically cooling down to obtain the pre-lithiated silicon monoxide particles:

(4) ultrasonically dispersing the pre-lithiated silicon monoxide particles in the aqueous solution of nickel citrate, wherein the mass ratio of the pre-lithiated, silicon, monoxide particles to nickel citrate is 10:1, and then stirring at 80° C. to volatilize the solvent, so that the catalyst precursor is uniformly loaded on the outer surface of pre-lithiated silicon monoxide to obtain the pre-lithiated silicon monoxide particles loaded with catalyst precursor;

(5) putting the silicon carbon particles loaded with catalyst precursor into a high-temperature furnace; simultaneously feeding mixed gas of hydrogen and argon, wherein the volume ratio of hydrogen to argon is 1:5; heating up the furnace to 300° C. for 2 h; fully reducing and activating the catalyst precursor; then keeping the volume ratio of hydrogen to argon unchanged; starting to feed a gas carbon source, which accounts for 10% of the total volume; heating up the furnace to 500° C. at this time; keeping the temperature for 0.5 h; and depositing graphene materials on, the outer surfaces of the pre-lithiated silicon monoxide particles under the action of a catalyst; and (6) uniformly mixing the pre-lithiated silicon monoxide particles coated with graphene materials with a solid carbon source; then adding the mixture into a fusion machine for homogeneous fusion at a rotating speed of 1,000 rpm for 2 h; and putting the mixture obtained after fusion into a high-temperature furnace at 1000° C. in inert, atmosphere for carbonization at a high temperature for 2 h to obtain the final pre-lithiated silicon-carbon multilayer composite negative electrode material for lithium ion batteries.

Embodiment 2

A preparation method of the pre-lithiated silicon-carbon multilayer composite negative electrode material for lithium ion batteries specifically includes the following steps:

(1) putting silicon monoxide particles into a jet mill for crushing;

(2) putting the crushed silicon monoxide particles into a fusion machine, and adding LiBMIM-TFSI, wherein the mass ratio of the silicon monoxide particles to the LiBMIM-TFSI is 20:1, the rotating speed of the fusion machine is 800 rpm and the fusion time is 5 h;

(3) putting the silicon monoxide particles fused with the LiBMIM-TFSI into a high-temperature tube furnace; sintering; feeding nitrogen for protection; heating up to 800° C. and keeping the temperature for 2 h so that the silicon monoxide particles can fully react with the lithium-containing ionic liquid; and then automatically cooling down to obtain the pre-lithiated silicon monoxide particles;

(4) ultrasonically dispersing the pre-lithiated silicon monoxide in the aqueous solution of nickel citrate, wherein the mass ratio of the silicon monoxide particles to nickel citrate is 5:1, and then stirring at 90° C. to volatilize the solvent, so that the catalyst precursor is uniformly loaded on the outer surfaces of pre-lithiated silicon monoxide particles to obtain the pre-lithiated silicon monoxide particles loaded with catalyst precursor;

(5) putting the pre-lithiated silicon monoxide particles loaded with catalyst precursor into a high-temperature furnace; simultaneously feeding mixed gas of ammonia and argon, wherein the volume of the ammonia accounts for 20%; heating up the furnace to 300° C. for 3 h; fully reducing and activating the catalyst precursor; then keeping the volume ratio of ammonia to argon unchanged; starting to feed a gas carbon source, which accounts for 14.29% of the total volume; heating up the furnace to 800° C. at this time; keeping the temperature for 15 min; sand depositing graphene materials on the outer surfaces of the pre-lithiated silicon monoxide particles under the action of a catalyst; and (6) uniformly mixing the pre-lithiated silicon monoxide particles coated with graphene materials with a solid carbon source; then adding the mixture into a fusion machine for homogeneous fusion at a rotating speed of 1,000 rpm for 1 h; and putting the mixture obtained after fusion into a high-temperature furnace at 1000° C. in argon atmosphere for carbonization at a high temperature for 2 h to obtain the final pre-lithiated silicon-carbon multilayer composite negative electrode material for lithium ion batteries.

Embodiment 3

A preparation method of the pre-lithiated silicon-carbon multilayer composite negative electrode material for lithium ion batteries specifically includes the following steps:

(1) putting silicon monoxide particles into a mechanical mill for crushing;

(2) putting the crushed silicon monoxide particles into a fusion machine, and adding lithium-containing ionic liquid $LiEMIM-PF_6$, wherein the mass ratio of the silicon monoxide particles to the lithium-containing ionic liquid is 30:1, the rotating speed, of the fusion machine is 1000 rpm and the fusion time is 3 h;

(3) putting the mixed silicon monoxide particles into a high-temperature tube furnace; sintering; feeding argon for protection; heating up to 500° C. and keeping the temperature for 2 h so that the silicon monoxide particles can fully react with the lithium-containing ionic liquid; and then automatically cooling down to obtain the pre-lithiated silicon monoxide particles;

(4) ultrasonically dispersing the pre-lithiated silicon monoxide particles in the aqueous solution of nickel citrate, wherein the mass ratio of the pre-lithiated, silicon, monoxide particles to nickel citrate is 10:1, and then stirring at 100° C. to volatilize the solvent, so that the catalyst precursor is uniformly loaded on the outer surfaces of pre-lithiated silicon monoxide particles to obtain the pre-lithiated silicon monoxide particles loaded with catalyst precursor;

(5) putting the pre-lithiated silicon monoxide particles loaded with catalyst precursor into a high-temperature furnace; simultaneously feeding mixed gas of hydrogen and argon, wherein the volume ratio of hydrogen to argon is 2:5; heating up the furnace to 500° C. for 3 h; fully reducing and activating the catalyst precursor; then keeping the volume ratio of hydrogen to argon unchanged; starting to feed a gas carbon source, which accounts for 18% of the total volume; heating up the furnace to 800° C. at this time; keeping the temperature for 10 min; sand depositing graphene materials on the outer surfaces of the pre-lithiated silicon monoxide particles under the action of a catalyst; and (6) uniformly mixing the pre-lithiated silicon monoxide particles coated with graphene materials with a solid carbon source; then adding the mixture into a fusion machine for homogeneous fusion at a rotating speed of 1,000 rpm for 2 h; and putting the mixture obtained after fusion into a high-temperature furnace at 1000° C. in inert, atmosphere for carbonization at a high temperature for 3 h to obtain the final pre-lithiated silicon-carbon multilayer composite negative electrode material for lithium ion batteries.

The pre-lithiated silicon-carbon multilayer composite negative electrode materials for lithium ion batteries obtained in the above embodiments are respectively mixed with conductive agents carbon black and sodium alginate according to a mass ratio of 6:2:2 to obtain a mixture; the solvent is deionized water; the mixture is stirred to form uniform slurry; the slurry is coated on a copper foil current collector; and then the copper foil current collector is dried and sliced to obtain pole pieces for batteries. CR2032 button batteries are assembled by taking lithium metal pieces as counter electrodes to undergo electrochemical performance test, and are charged and discharged with constant current at room temperature, wherein the current density is 100 mA/g, and the cut-off voltage is 0.005-2V. The results are as follows:

| Embodiment | Initial discharge capacity (mAh/g) | Initial coulombic efficiency (%) | 50-week capacity retention rate (%) |
|---|---|---|---|
| Embodiment 1 | 1578 | 85.3 | 88.9 |
| Embodiment 2 | 1425 | 83.8 | 85.6 |
| Embodiment 3 | 1463 | 84.7 | 87.2 |

The test results show that the pre-lithiated silicon-carbon multilayer composite negative electrode material for lithium ion batteries prepared in the present invention has the characteristics of high conductivity, high ICE and stable cycling performance.

The above only describes preferred embodiments of the present invention and is not intended to limit the technical scope of the present invention. Any minor amendment, equivalent change and modification made to the above embodiments according to the technical essence of the present invention shall still belong to the protection scope of the technical solutions of the present invention,

We claim:

1. A preparation method of a pre-lithiated silicon-carbon multilayer composite negative electrode material for lithium ion batteries, comprising: firstly, taking silicon monoxide as a raw material, mixing silicon monoxide with lithium-containing ionic liquid for sintering and pre-lithiation to obtain pre-lithiated silicon monoxide particles; then, loading a catalyst precursor on surfaces of the pre-lithiated silicon monoxide particles, growing graphene materials on a surface of pre-lithiated silicon monoxide by chemical vapor deposition (CVD); and finally, homogeneously fusing the pre-lithiated silicon monoxide particles coated with the graphene materials with a carbon source and performing heat treatment, to obtain a final pre-lithiated silicon-carbon multilayer composite negative electrode material for lithium ion batteries.

2. The preparation method of the pre-lithiated silicon-carbon multilayer composite negative electrode material for lithium ion batteries according to claim 1, specifically comprising the following steps:
   (1) mixing silicon monoxide with a certain particle size with lithium-containing ionic liquid, and then sintering the mixture in a high-temperature tube furnace, so that silicon monoxide and lithium-containing ionic liquid fully react to obtain pre-lithiated silicon monoxide particles;
   (2) uniformly dispersing a certain proportion of pre-lithiated silicon monoxide particles in a solution of catalyst precursor by ultrasonic treatment, and then stirring the solution at a certain temperature to volatilize the solvent, so that the catalyst precursor is uniformly loaded on the surfaces of the pre-lithiated silicon monoxide particles;
   (3) putting the pre-lithiated silicon monoxide particles loaded with the catalyst precursor into a high-temperature furnace; keeping the temperature in a gas mixture of inert gas and reducing gas for a period of time to fully reduce the catalyst precursor; then keeping the volume ratio of the inert gas to the reducing gas unchanged, starting to feed a gas carbon source; decomposing and reconstructing the carbon source at a higher temperature; and depositing graphene materials on the outer surfaces of pre-lithiated silicon monoxide particles; and
   (4) uniformly mixing the pre-lithiated silicon monoxide particles coated with the graphene materials with a solid carbon source; then adding the mixture into a fusion machine for homogeneous fusion; and then putting the obtained mixture into a high-temperature furnace for carbonization at a high temperature in an inert atmosphere to obtain the final pre-lithiated silicon-carbon multilayer composite negative electrode material for lithium ion batteries.

3. The preparation method of the pre-lithiated silicon-carbon multilayer composite negative electrode material for lithium ion batteries according to claim 2, wherein silicon monoxide in step (1) has a particle size of 10 nm-10 μm.

4. The preparation method of the pre-lithiated silicon-carbon multilayer composite negative electrode material for lithium ion batteries according to claim 2, wherein the lithium-containing ionic liquid in step (1) is one or more of LiMIM-TFSI, LiEMIM-BF4, LiEMIM-PF6, LiEMIM-TFSI, LiPMMIM-TFSI, LiBMIM-TFSI, LiAAIM-Cl, LiAMIM-Br, LiAEIM-Br, LiAAIM-Br, LiAAIM-I, LiAAIM-TFSI, LiAMIM-TFSA, LiAMIM-BF4, LiEMIMBF4, LiEMIMTFSI, LiEMIMTFSI, LiBMIMBF, LiBMIMPF6, LiBMIMPF6 and LiPMMIMTFSI.

5. The preparation method of the pre-lithiated silicon-carbon multilayer composite negative electrode material for lithium ion batteries according to claim 2, wherein the mass ratio of silicon monoxide to lithium-containing ionic liquid in step (1) is (10-35):1.

6. The preparation method of the pre-lithiated silicon-carbon multilayer composite negative electrode material for lithium ion batteries according to claim 2, wherein one of inert gases of nitrogen, argon and helium is fed into the high-temperature tube furnace in step (1); and the sintering temperature is 500-1,000° C.

7. The preparation method of the pre-lithiated silicon-carbon multilayer composite negative electrode material for lithium ion batteries according to claim 2, wherein the mass ratio of the pre-lithiated silicon monoxide particles to the catalyst precursor in step (2) is (20-1):1.

8. The preparation method of the pre-lithiated silicon-carbon multilayer composite negative electrode material for lithium ion batteries according to claim 2, wherein the catalyst precursor used in step (2) is one or more of transition metal salts, wherein the transition metal salts comprise ferric chloride, ferrous chloride, ferric nitrate, ferrous nitrate, ferric acetate, ferrous acetate, ferric sulfate, ferrous sulfate, ferric oxalate, ferrous oxalate, ferric citrate, ferrous gluconate, ferrocene, cobalt chloride, cobalt nitrate, cobalt acetate, cobalt sulfate, cobalt oxalate, cobalt citrate, cobalt gluconate, cobaltocene, nickel chloride, nickel nitrate, nickel acetate, nickel sulfate, nickel oxalate, nickel citrate, nickel gluconate, nickelocene, copper chloride, copper nitrate, copper acetate, copper sulfate, copper oxalate, copper citrate, copper gluconate and the like; and the solvent is one or more of water, methanol, ethanol, ethylene glycol, isopropanol, glycerol, diethyl ether, acetone, benzene and toluene.

9. The preparation method of the pre-lithiated silicon-carbon multilayer composite negative electrode material for lithium ion batteries according to claim 2, wherein the temperature for stirring the solution in step (2) is 25-200° C.

10. The preparation method of the pre-lithiated silicon-carbon multilayer composite negative electrode material for lithium ion batteries according to claim 2, wherein the inert gas in step (3) is one of nitrogen, argon and helium; the reducing gas is one or more of hydrogen, ammonia, methane and nitric oxide; a volume percentage of the reducing gas for the gas mixture of inert gas and reducing gas is 10-40%; the gas carbon source accounts for 5-25% of a total volume of the inert gas and the reducing gas and the gas carbon source.

11. The preparation method of the pre-lithiated silicon-carbon multilayer composite negative electrode material for lithium ion batteries according to claim 2, wherein the temperature for precursor reduction in step (3) is 300-600° C. and is kept for 1-10 h; and the temperature for graphene deposition is 500-1,000° C. and is kept for 5 min-1 h.

12. The preparation method of the pre-lithiated silicon-carbon multilayer composite negative electrode material for lithium ion batteries according to claim 2, wherein the solid carbon source used in step (4) is one or more of sucrose, petroleum asphalt, coal tar, epoxy resin, phenolic resin, polyvinyl alcohol and polyvinyl chloride; the rotating speed of the fusion machine is 1,000-2,000 rpm during fusion; and the fusion time is 1-4 h.

13. The preparation method of the pre-lithiated silicon-carbon multilayer composite negative electrode material for lithium ion batteries according to claim 2, wherein the temperature for carbonization in step (4) is 700-1,000° C. and is kept for 1-8 h.

* * * * *